United States Patent

[11] 3,580,514

| [72] | Inventor | Tony Radecki<br>West Covina, Calif. |
|---|---|---|
| [21] | Appl. No. | 812,625 |
| [22] | Filed | Apr. 2, 1969 |
| [45] | Patented | May 25, 1971 |
| [73] | Assignee | Rain Bird Sprinkler Mfg.<br>Glendora, Calif. |

[54] DISTANCE SELECTOR FOR SPRINKLERS
2 Claims, 7 Drawing Figs.
[52] U.S. Cl. ................................................ 239/521,
239/505, 239/511, 239/513, 239/538
[51] Int. Cl. ................................................ B05b 1/26
[50] Field of Search ................................................ 239/521,
518, 505, 510, 511, 513, 516, 538

[56] References Cited
UNITED STATES PATENTS

| 2,524,622 | 10/1950 | Caparone | 239/518 |
|---|---|---|---|
| 2,909,325 | 10/1959 | Hunter | 239/518X |
| 713,093 | 11/1902 | Gregory | 239/538 |
| 1,873,321 | 8/1932 | Elder | 239/538X |

Primary Examiner—M. Henson Wood, Jr.
Assistant Examiner—Thomas C. Culp, Jr.
Attorney—Lyon and Lyon ABSTRACT: A distance selector for a sprinkler having an upwardly projecting stem in which is formed an upwardly and outwardly directed orifice, the selector being in the form of a ring rotatably mounted on the stem above the orifice and having a depending rim of varying depth which on rotary adjustment of the ring intercepts the water stream varying amounts; the stem having a handle projection so that the stem may be restrained to permit adjustment of the ring.

Patented May 25, 1971    3,580,514

INVENTOR.
TONY RADECKI
BY Lyon & Lyon
ATTORNEYS

DISTANCE SELECTOR FOR SPRINKLERS

BACKGROUND OF THE INVENTION

The present invention is related to but not limited to use in conjunction with the type of rotary sprinkler more fully disclosed in copending application, Ser. No. 810,132, filed Mar. 25, 1969. In the companion application, an impact-type water motor causes an upwardly directed stem having an upwardly and laterally directed orifice to rotate slowly. The selector is mounted on the stem and is adjustable to control the trajectory of the water stream.

SUMMARY OF THE INVENTION

A particularly inexpensive and simple distance selector for sprinklers in which a sprinkler stem is provided with a retainer channel located above a sprinkler orifice and into which is pressed a selector ring having a depending rim of varying depth so that as the ring is turned, the rim intercepts the water to a greater or lesser extent, the stem protruding outwardly from the selector ring to form a handle so that the stem may be restrained while the selector ring is turned.

SPECIFICATION

Figure 1:
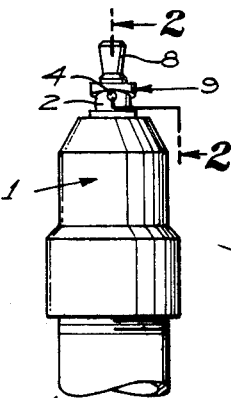
FIG. 1 is a side view of a sprinkler embodying the invention.
Figure 2:
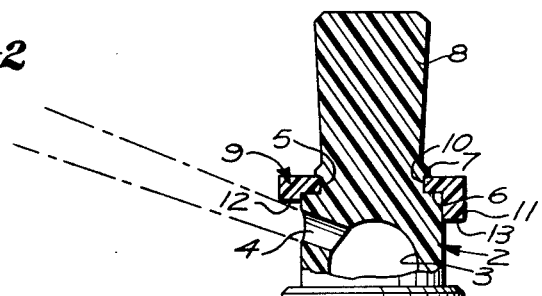
FIG. 2 is an enlarged fragmentary, partial sectional, partial side view, taken through 2–2 of FIG. 1, showing the distance selector in position to permit maximum trajectory of the jet stream issuing from the sprinkler orifice.
Figure 4:
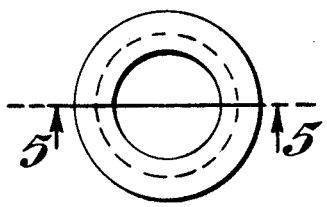
FIG. 4 is a plan view of the selector ring.
Figure 5:
FIG. 5 is a transverse sectional view thereof, taken through 5–5 of FIG. 4.
Figure 3:
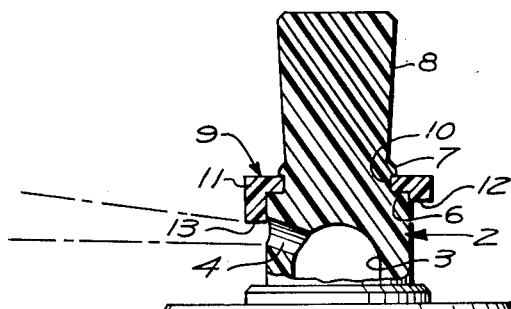
FIG. 3 is a similar partial sectional, partial elevational view, showing the selector adjusted for minimum trajectory of the water stream.

For purposes of illustration, the distance selector is shown as applied to the type of rotary sprinkler more fully described in the aforementioned patent application. In the companion application, there is provided a sprinkler body 1, housing a water motor and from which projects a stem 2, having a bore 3 terminating above the body 1, and provided with a laterally and upwardly directed orifice 4. Above the orifice 4, the stem 2 is provided with an annular channel or groove 5, forming a shoulder 6 at its lower side and a rudimentary retainer ridge 7 at its upper side. The stem projects above the channel 5 to form a handle 8.

The distance selector includes a selector ring 9, preferably formed of plastic material, and having a central opening 10 capable of slight elastic distortion so that the selector ring may be snapped over the retainer ridge 7. The selector ring is provided with a depending rim 11, dimensioned to fit over the stem 2 immediately adjacent the shoulder 6. The rim 11 varies in depth between a minimum point 12 and a maximum point 13.

Operation of the distance selector is as follows:

The dimensions of the selector ring and the groove or channel 5 in which it fits are such that the selector ring does not turn freely, yet is capable of being turned manually. Adjustment is made by holding the handle 8 with one hand, while turning the selector ring 9 with the other hand. The degree of deflection of the water stream is determined by the distance the rim projects into the normal stream.

Figure 6:
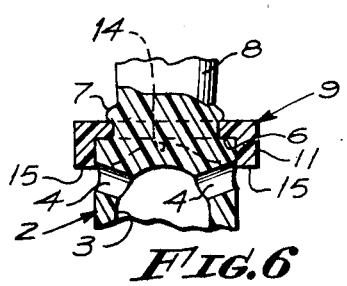
FIG. 6 is a fragmentary sectional view, similar to FIG. 3, showing a modified form of the selector ring for the control of a pair of diametrically disposed water jets.
Figure 7:
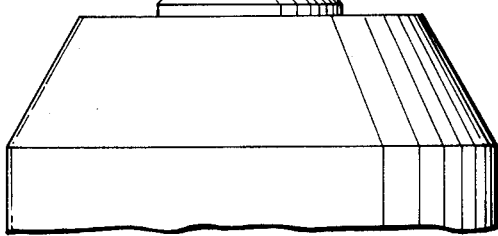
FIG. 7 is a sectional view, corresponding to FIG. 5, showing a further modification of the distance selector.
Figure 7:
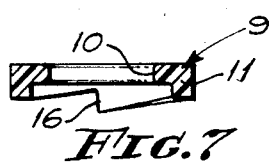

Reference is now directed to FIG. 6. In the previous described sprinkler, a single orifice 4 is illustrated. However, the sprinkler may be provided with two orifices. In this case, the depending rim 11 is modified to provide two minimum points 14 and two maximum points 15. In this case, the deflector ring is turned 90° from its minimum to its maximum adjustment. Alternatively, as shown in FIG. 7, a greater degree of rotational adjustment may be attained by arranging the undersurface of the rim in the form of two half-turn double pitched helices separated by shoulders 16. If two orifices are provided, they may be of different size and disposed at different angles, in which case the rim may be modified accordingly.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A distance selector for sprinklers, comprising:
   a. a rotary upstanding stem having an upwardly and outwardly directed orifice, and a journal groove adjacent said orifice;
   b. a selector ring frictionally received in said journal groove;
   c. an integral rim of varying depth projecting axially from said ring and dimensioned to project into the path of the water stream issuing from said orifice, thereby to deflect the water stream;
   d. said ring and rim being circumferentially adjustable on said stem to vary the deflection of the water stream;
   e. said stem projecting above said selector ring to form a handle for restraining said stem during circumferential adjustment of said selector ring.

2. A selector, as defined in claim 1, wherein:
   a. said groove is bordered at its underside by a stop shoulder and at its upperside by a rudimentary ridge;
   b. and at least said selector ring is formed of yieldable plastic material capable of being pressed over said ridge.